United States Patent
Kerry et al.

(10) Patent No.: US 7,198,410 B2
(45) Date of Patent: Apr. 3, 2007

(54) OPTICAL FIBER ASSEMBLY AND METHOD OF INSTALLING OPTICAL FIBERS IN A JOINT HOUSING

(75) Inventors: John Kerry, Ipswich (GB); Roger John Pike, Chepstow (GB); Ralph Sutehall, Gwent (GB)

(73) Assignee: Prysmian Cables & Systems Limited, London (GB)

( * ) Notice: Subject to any disclaimer, the term of this patent is extended or adjusted under 35 U.S.C. 154(b) by 188 days.

(21) Appl. No.: 10/488,678

(22) PCT Filed: Sep. 6, 2002

(86) PCT No.: PCT/GB02/04079

§ 371 (c)(1),
(2), (4) Date: Mar. 5, 2004

(87) PCT Pub. No.: WO03/023466

PCT Pub. Date: Mar. 20, 2003

(65) Prior Publication Data

US 2004/0240793 A1 Dec. 2, 2004

(30) Foreign Application Priority Data

Sep. 7, 2001 (EP) ................... 01307597

(51) Int. Cl.
*G02B 6/36* (2006.01)
*G02B 6/00* (2006.01)
*B65H 20/14* (2006.01)

(52) U.S. Cl. .................. 385/76; 385/77; 385/88; 385/134; 385/135; 385/136; 385/139; 226/7

(58) Field of Classification Search ........... 385/76–77, 385/134–136, 139, 88; 226/7
See application file for complete search history.

(56) References Cited

U.S. PATENT DOCUMENTS 4,330,172 A * 5/1982 Monaghan et al. ........... 385/60
4,374,596 A 2/1983 Schlemmer et al.

(Continued)

FOREIGN PATENT DOCUMENTS

DE 299 23 007 U 1 6/2001
EP 0 108 590 5/1984

OTHER PUBLICATIONS

John Guest Connectors Catalogue, "Super Speedfit Fittings", 1 page, (Mar. 5, 2001).

*Primary Examiner*—Frank G. Font
*Assistant Examiner*—Michael P. Mooney
(74) *Attorney, Agent, or Firm*—Finnegan, Henderson, Farabow, Garrett & Dunner, L.L.P.

(57) ABSTRACT

An optical fiber assembly includes: a component defining at least one inlet for optical fibers, an adapter, an optical fiber cable connected to the adapter, and a push-fit connector. The component includes a through-hole for passage of the optical fibers and an associated mating region to engage the push-fit connector. The optical fiber cable connected to the adapter defines a connection region with a predetermined cross-sectional shape for mating with the push-fit connector. The push-fit connector includes a first end, a second end, and a through-passage extending between the first and second ends. The first end is push-fit connected with the mating region. The second end is push-fit connected to the connection region. Optical fibers from the optical fiber cable can be directed through the push-fit connector and the through-hole. A method of installing optical fibers in a joint housing is also disclosed.

24 Claims, 4 Drawing Sheets

U.S. PATENT DOCUMENTS

| | | | |
|---|---|---|---|
| 4,618,986 A * | 10/1986 | Hower | 381/67 |
| 4,669,791 A * | 6/1987 | Savill | 439/34 |
| 4,754,897 A * | 7/1988 | Brace | 222/402.16 |
| 4,952,021 A | 8/1990 | Aoki et al. | |
| 5,042,907 A | 8/1991 | Bell et al. | |
| 5,179,617 A * | 1/1993 | Stockman | 385/136 |
| 5,231,687 A * | 7/1993 | Handley | 385/139 |
| 5,383,691 A * | 1/1995 | Anthony | 285/325 |
| 5,533,164 A | 7/1996 | Preston et al. | |
| 5,557,703 A | 9/1996 | Barker et al. | |
| 6,222,977 B1 * | 4/2001 | Kawada et al. | 385/136 |
| 6,418,264 B1 | 7/2002 | Hough et al. | |
| 2002/0191942 A1 | 12/2002 | Griffiths et al. | |

FOREIGN PATENT DOCUMENTS

| | | |
|---|---|---|
| EP | 0 345 968 | 12/1989 |
| EP | 0 521 710 | 1/1993 |
| EP | 0 646 818 | 4/1995 |
| EP | 0 662 622 A1 | 7/1995 |
| EP | 0 939 267 B1 | 9/1999 |
| EP | 0 980 012 A1 | 2/2000 |
| EP | 0 981 775 | 3/2000 |
| EP | 1 267 190 A1 | 12/2002 |
| GB | 2 351 333 A | 12/2000 |
| JP | 08-075970 | 3/1996 |
| JP | 08-201667 | 8/1996 |
| JP | 10-62668 | 3/1998 |
| JP | 10-197765 | 7/1998 |
| JP | 11-51852 | 2/1999 |

\* cited by examiner

OPTICAL FIBER ASSEMBLY AND METHOD OF INSTALLING OPTICAL FIBERS IN A JOINT HOUSING

CROSS REFERENCE TO RELATED APPLICATIONS

This application is a national phase application based on PCT/GB02/04079, filed Sep. 6, 2002, the content of which is incorporated herein by reference, and claims the priority of European Patent Application No. 01307597.3, filed Sep. 7, 2001.

BACKGROUND OF THE INVENTION

1. Field of the Invention

The invention relates to joining optical fibres and particularly, but not exclusively to joining optical fibres at the customer end of telecommunications networks, often referred to as the secondary, or access network.

2. Description of the Related Art

Typically in telecommunications, joints are provided where it is desired to distribute optical fibres to customers. At the joint, optical fibres leading from a main, or primary network may be connected to fibres on a secondary network leading to individual customer locations. Hereinafter fibres from the main network will be described as being supplied along a primary cable as primary fibres, and fibres leading to customer locations will be described as being supplied in secondary cables as secondary fibres. However, such joints can be provided to connect optical fibres from two primary cables thereby increasing the total length of cable and it is to be understood that references to primary, or first, and secondary, or second, fibres and networks herein are made for ease of description and should not be taken as limiting.

In an installation for connecting optical fibres, an optical fibre cable is typically connected to a joint arrangement where the optical fibres (e.g. primary and secondary optical fibres) are joined. Such joints are usually provided underground and may be accessed via a man-hole to enable connection work and fibre routing to be carried out by an engineer, or installer.

Secondary optical fibres may be provided in enhanced performance fibre units (EPFU) that may comprise one or more fibres extending along a tube. The tube may be installed without optical fibres and when required, the optical fibres are blown through the tube using known techniques. Typically, the tubes are made from polyethylene and have a carbon loaded radially inner surface to increase conductivity, as disclosed, for example, in U.S. Pat. No. 4,952,021. This helps dissipate static charges developed during blowing that can hinder installation of fibres along the tube.

Primary cables typically comprise a plurality of optical fibre bundles, or units, each bundle typically comprising eight or twelve fibres. At a joint location, the optical fibres are separated and the individual optical fibres are managed and routed to housings, or splice trays, where they may be connected to secondary optical fibres leading to individual customer locations. An example of these housings, or splice trays, is disclosed in the applicant's earlier application, EP-A-0981775. Each housing comprises a first port into which fibres may be routed from a primary cable and a second port into which fibres may be routed from customer locations. Alternatively, the housings can be used to connect fibres from two primary cables.

Figure 1:
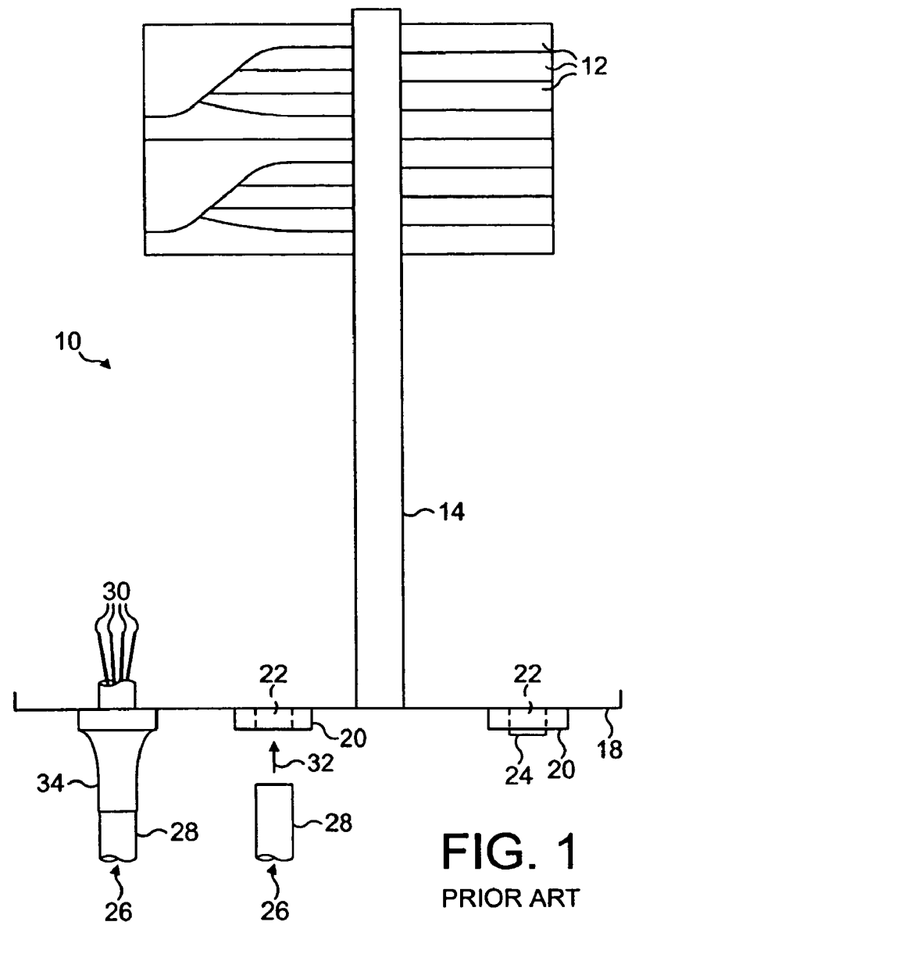
FIG. 1 is a schematic illustration of a known installation including a joint arrangement for joining optical fibres.

FIG. 1 is a schematic illustration of an optical fibre installation comprising a joint arrangement 10 in which a plurality of housings 12, as disclosed in EP-A-0981775, are utilised for joining primary and secondary fibres. The arrangement comprises a plurality of housings, or splice trays, 12 each of which has respective inlet ports, not shown, for receiving primary and secondary optical fibres. The splice trays 12 are supported by an upright member, or joint spine 14, which extends from a base member 18 that typically takes the form of a generally flat plate. The base member 18 includes a plurality of spigots 20 each of which has an axially extending through-hole 22. The end of the through-hole 22 disposed on the outside of the joint, that is the end disposed remote from the surface of the base member from which the joint spine extends, is closed by a knockout 24.

In use, when it is desired to route fibres from a secondary cable 26 into the joint, the knockout 24 is removed and the tube 28 containing the fibres 30 of the secondary cable is inserted into the joint via the through-hole 22 as indicated by arrow 32. A heat shrink sleeve 34, previously threaded onto the tube 28, is then collapsed onto the tube and spigot 22 to seal the external entry point of the secondary cable 26 to the base member to prevent the ingress of moisture and dirt.

Collapse of the heat shrink sleeve 34 is caused by applying heat to it, typically by way of a flame. As observed by the Applicant, this limits the number of secondary cables 26 that can be inserted into a base member 18 of a given area, since it is necessary to leave sufficient space between each spigot 20 to ensure that when heat is applied to a heat shrink sleeve 34, it will not damage adjacent secondary cables.

Installing joint arrangements 10 is expensive and it is desirable that each installation should be kept relatively small and supply the maximum number of customers. On the primary side, primary cables comprising large numbers of primary fibres are available. For example, primary cables comprising twelve fibre bundles, each bundle containing eight optical fibres, (making ninety-six optical fibres in total) are known. Until recently, two fibres were needed to allow communication at a customer location; a first optical fibre transmitting light and a second optical fibre receiving light. Therefore, the exemplary primary cable having ninety-six primary fibres could be connected to a joint arrangement for connection to forty-eight customer locations Recently, single fibre circuits have been introduced in which a single fibre both transmits and receives light. In this case, the exemplary primary cable having ninety-six primary fibres may be connected to a joint arrangement for connection to ninety-six customer locations, although often where a customer is a business, it will require more than one connection, and in some cases, the installation may include single and twin fibre circuits.

SUMMARY OF THE INVENTION

The applicant has devised an optical fibre installation and a method for installing optical fibres which provide flexibility for routing secondary fibres to customer locations and at the same time provide the possibility of having a relatively compact installation with an increased density of secondary fibre entry points, as compared with prior art installations such as the one shown in FIG. 1, if such density is desired.

Accordingly the invention provides an installation comprising (i) a part defining at least one inlet for optical fibres that comprises a through-hole for the passage of optical fibres and an associated mating region for a push-fit connector, (ii) an optical fibre cable connected to an adapter that defines a connection region having a predetermined cross-section for mating with a push-fit connector and (iii) a push-fit connector having a first end, a second end, a through-passage extending between said ends and a seal associated with said first end, said second end of the push-fit connector being push-fit connected to said connection region of the adapter and said first end of the push-fit connector being push-fit connected with the mating region of the or one of said inlets such that said seal sealingly engages said inlet defining part and the arrangement being such that optical fibres from said optical fibre cable can be directed through said push-fit connector and said through-hole of the inlet having the mating region to which the push-fit connector is push-fitted.

In the present description and claims, the term "joint arrangement" includes any arrangement, assembly or device or the like suitable for housing and making a joint between two or more optical fibres, for example, an optical fibre from a primary optical cable and a secondary optical cable. Typically the joint arrangement will be a sealed container made, for example, of metal or plastics. The container may house splice trays in which optical fibres can be joined by splicing and the inlet defining part will typically form the base member of the container, although it may instead form, or be part of, another wall and could be located within the container. One suitable joint arrangement is the OAsys Blown Fibre Generic Joint marketed by Pirelli Cables Limited.

In the present description and claims, the term "push-fit connector" is intended to include any and all connectors that would be recognised as such according to the common meaning of the term in the art, including any connector which makes a connection essentially by an axial pushing movement. The push-fit connector could, for example, take the form of a body to which the cable is attached and which mates with an orifice by means of axial insertion thereinto, the mating providing an interference sufficient to make and retain the connection and the interference being provided by the fit between the body and the orifice or one or more parts carried by one or each of the body and the orifice. In another example, the push-fit connector could be a body to which the cable is attached and which has an opening which receives a mating part to make a connection by virtue of an interference between the body and the mating part or any combination of parts associated with the body or mating part. In one preferred embodiment, the push-fit connector comprises a cylindrical body that attaches to an optical fibre cable and connects with the mating part in the form of a spigot by an axial pushing movement of the body such that the spigot is received in the body and the connection therebetween is made and retained by virtue of an interference between the spigot and a deformable annular member carried by the body, which member may take the form of a collet or an O-ring.

Figure 2:
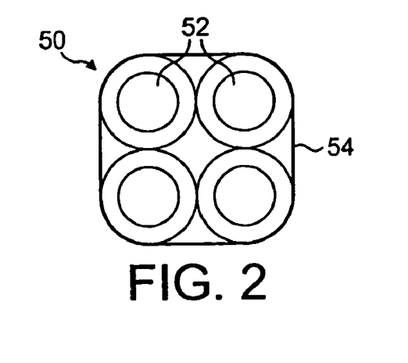
FIG. 2 is an end elevation of a four-tube optical fibre cable.
Figure 3:
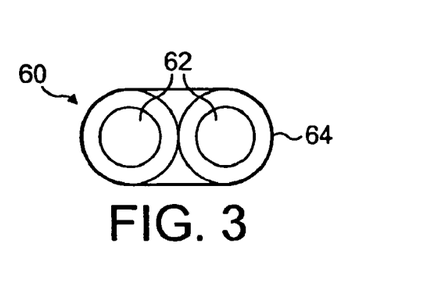
FIG. 3 is an end elevation of a two-tube optical fibre cable.

The adapter is particularly useful where the optical fibre cable to be joined is non-circular. Generally speaking, in order to make a successful connection using a conventional push-fit connector, the optical fibre cable should be circular and the tolerance on the diameter of the unit should be small, typically +/−0.1 mm. Often optical fibre cables are non-circular as shown in FIGS. 2 and 3. FIG. 2 illustrates an optical fibre cable 50 comprising four tubes 52 for optical fibres enclosed in sheathing 54. It will be observed that the optical fibre cable is non-circular in cross-section and is much closer to being rectangular.

FIG. 3, illustrates one alternative configuration of optical fibre cable 60. The cable 60 comprises two tubes 62 for optical fibres enclosed by sheathing 64. In this case, the optical fibre cable is non-circular in cross-section and is closer to being elliptical.

In either case, the cables are not suitable for connection by means of conventional push-fit connectors designed for use with circular tubing. Even in cases where the optical fibre cable is circular, manufacturing techniques are such that the tolerance on the diameter may be +/−0.5 mm. Accordingly, even in cases where the optical fibre cable is essentially circular, the adapter will serve to ensure a connection can be made between a conventional push-fit connector and an optical fibre cable.

Another aspect of the invention relates to an optical fibre installation comprising a part to which an optical fibre cable is to be connected, said part defining at least one optical fibre inlet that comprises a through-passage and an associated mating part for a push-fit connector, a push-fit connector having a first end and a second end, and an adapter for said push-fit connector, said first end of said push-fit connector being push-fit connected to the mating part of the or a said inlet and said adapter having a first portion push-fit connected to said second end of the push-fit connector and a second portion connected to an end of an optical fibre cable.

The inlet defining part will usually define a plurality of said inlets and will have respective optical fibre cables connected with at least two said inlets by respective said push-fit connectors push-fit connected to the mating regions of said inlets and respective said adapters.

Another aspect of the invention relates to a method of installing optical fibres in a joint housing, said method comprising connecting an optical fibre cable to an adapter having a connection region that has a predetermined cross-section for mating with a push-fit connector, push-fit connecting said adapter to a push-fit connector that defines a through-passage and push-fit connecting the push-fit connector with a mating region associated with an optical fibre inlet of a joint housing such that a seal carried by said push-fit connector sealingly engages said mating region and optical fibres can pass from the optical fibre cable into said inlet via said through-passage.

BRIEF DESCRIPTION OF THE DRAWING

In order that the invention may be well understood, embodiments thereof, which are given by way of example only, will now be described with reference to the drawings, in which.

DETAILED DESCRIPTION OF THE DRAWING

Figure 4:
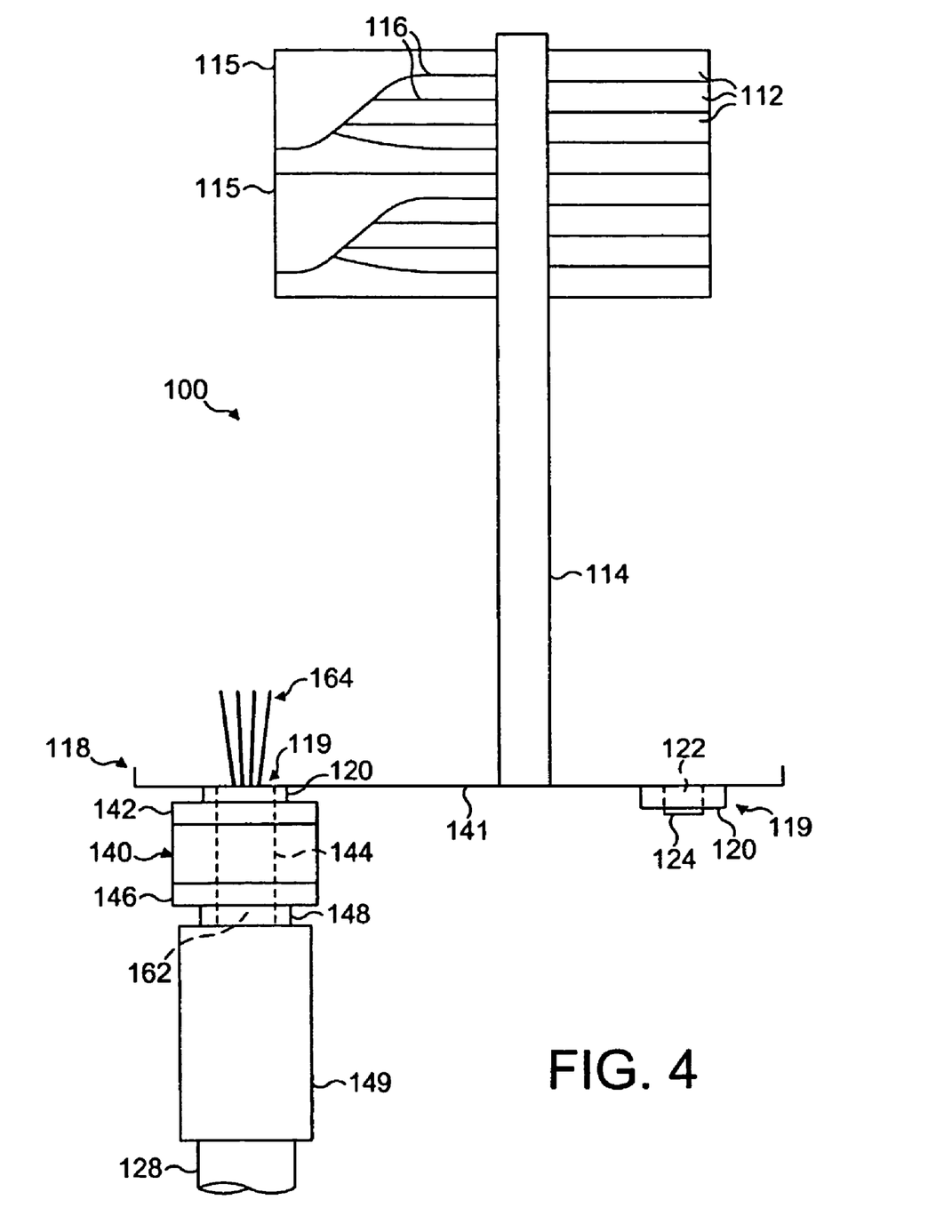
FIG. 4 is a schematic illustration of an installation according to the invention.

Referring to FIG. 4, a joint arrangement 100 for optical fibres includes a plurality of housings, or splice trays 112 in which joints between primary and secondary optical fibres can be made. The splice trays 112 are connected as a stack to an upright member, or joint spine 114. The splice trays 112 each have respective inlet ports (none shown) for receiving primary and secondary fibres to be joined and/or stored therein. The stack shown in the drawing comprises eight splice trays 112, although it will be appreciated that further trays may be added to the stack as required. Two routing devices 115, each associated with four of the splice trays, are provided for routing primary optical fibres into the splice trays and, as shown, each device defines a plurality of guide channels 116 for guiding primary fibres to the inlets therefor of the associated splice trays. For further details of the splice trays, routing devices and other routing equipment used to manage the routing of the fibres to the splice trays, attention is directed to the applicant's copending applications EP-A-0981775, EP01305038.0 and EP01305228.7, each of which is incorporated herein by reference.

The joint arrangement 100 includes a part, or base member 118, which defines at least one inlet 119 for optical fibres. As shown in the embodiment illustrated in FIG. 6, the base member 118 is typically a generally flat plate. The or at least one of the inlets 119 comprises a through-hole 122 that extends through the base member and a mating region in the form of a spigot 120. The through-holes 122 are preferably closed by knockouts 124. As an alternative to knockouts, the through-holes could be closed by plugs or the like. The spigots 120 project from the side 141 of the base member that is opposite the side from which the joint spine 114 projects. In use, the side 141 is an outer side of the joint arrangement.

An installation utilising the joint arrangement 100 includes a push-fit connector 140 having a first end 142 push-fit connected with a spigot 120 and having a through-passage 144 extending between the first end 142 and a second end 146 of the connector. The installation also includes a secondary optical fibre cable 128, which has an end push-fit connected with the second end 146 of the push-fit connector 140 via an adapter 148 that is secured to the cable end by a heat shrink sleeve 149.

Figure 5:
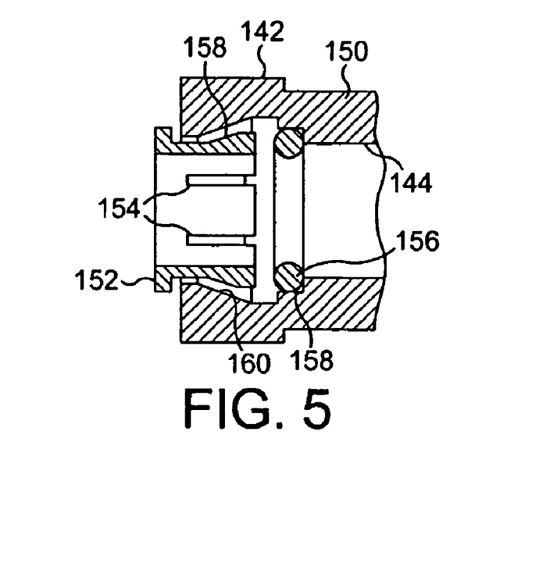
FIG. 5 is a sectional view of an end of a push-fit connector used in the installation shown in FIG. 4.

An example of a suitable push-fit connector 140 is illustrated in FIG. 5, which shows one end of the connector; the other end corresponds. The push-fit connector comprises a generally cylindrical body 150. The through-passage 144 extends axially of the body 150 between the ends 142, 146 of the push-fit connector. A collet-like gripping member (for convenience now simply referred to as a collet) is housed in an enlarged portion of the through-passage 144 at the end 142 of the push-fit connector. The collet 152 is in the form of a sleeve provided with axially extending slits 154 that provide the collect with a certain amount of radial flexibility. An O-ring 156 is seated against a shoulder 158 defined by the body 150 at a position axially inwardly of the collet 152.

In use, when a suitably-sized cylindrical object is inserted into the collet 152, the collet expands radially outwardly in the region of the slits 154 bringing a tapering outer wall portion 158 of the collet into engagement with a tapering wall 160 of the through-passage 144. The engagement of these tapering walls 158, 160 produces a wedge-effect so that the cylindrical object inserted into the collet is held firmly by the connector. It will be appreciated that the connector is designed to be used with a particular diameter of cylindrical object and provided the object inserted into the collet is within a certain range of diameters, it will be securely gripped by the collet and the O-ring 156 will seal against it.

Referring to FIG. 5, will be noted that there is a clearance between the collet 152 and the connector body 150 that permits the collet to be moved axially inwardly of the push-fit connector (to the right as viewed in the drawing). This movement permits the release of an object gripped by the collet as it moves the tapering walls 158, 160 out of engagement. Push-fit connectors of this type are made by John Guest connectors Ltd of Horton Road, West Drayton, Middlesex, UB7 8JP, United Kingdom and in embodiments produced by the applicant, connectors supplied by this company have worked well.

The adapter 148 is a generally cylindrical body and like the push-fit connector 140, it has a through-passage 162 (it may have more than one). The adapter body has an end that defines a connection region and has a predetermined cross-section designed to interact with the collet 152 so as to provide a secure connection between the push-fit connector 140 and the adapter.

In order to connect the secondary optical fibre cable 128 to the base member 118, the sheathing of the cable is stripped back a suitable distance to expose the optical fibres 164, which are threaded through the through-passage 162. The heat shrink sleeve 149 is then shrunk onto the cable sheathing and the adapter so as to firmly secure the adapter to the cable. The optical fibres 164 are then threaded through the through-passage 144 of the push-fit connector 140, which then has its second end 146 push-fit connected to the adapter 148. The secure connection between the push-fit connector and the adapter provides a secure connection between the push-fit connector and the cable 128 via the adapter. The cable can then be secured to the base member 118 by removing the knockout 124 of the selected inlet 119 and feeding the optical fibres 164 through the through-hole 122 of the inlet and then push-fitting the first end 142 of the push-fit connector 140 onto the spigot 120 of the inlet.

It will be appreciated that the O-ring 156 at the first end of the push-fit connector 140 sealingly engages the spigot 120. Therefore, since it is not necessary to allow clearance around the inlet 119 to allow for the application of a shrink fit sleeve as shown in FIG. 1, the inlets 119 can be positioned closer together allowing a greater number of inlets to be provided on a base member having a given available area for the siting of such inlets.

It will also be appreciated that the heat required to shrink the heat shrink sleeve 149 onto the secondary optical fibre cable 128 and the adapter 148 can be applied while the adapter and the cable are removed from the vicinity of the base member, thereby avoiding the problem of inadvertently applying heat to other optical fibre units connected to the base member. Similarly, if the installer wishes to provide a heat shrink sleeve to wrap around the push-fit connector 140 and the adapter, the heat required to shrink the sleeve can be applied while the parts are situated away from the base member 118.

The adapter 148 may comprise a simple cylindrical body having a diameter selected to be suitable for fitting with the push-fit connector 140. The adapter may have a reduced diameter portion at the end engaged by the heat shrink sleeve 149. The shoulder defined by the reduced diameter portion would then provide a useful position indicator against which the installer can gauge the correct axial positioning for the heat shrink sleeve. It will be appreciated that generally the shape of the adapter 148 is not critical and may be adapted to suit any particular requirement and all that is required is that the end defining the connection region is of the correct diameter to co-operate with the push-fit connector. The adapter is preferably made from a plastics material, preferably a thermoplastic resin such as, for example, Acrilonitrile Butadiene Styrene (ABS), and can be manufactured by in any suitable manner, such as moulding, for example, injection moulding.

An alternative installation 170 will now be described with reference to FIGS. 2 and 6 to 8. There are many similarities between the installation 100 and the installation 170 and to avoid unnecessary repetition of description, like parts will be indicated with the same reference numeral.

The secondary cable 128 shown in FIG. 4 may be generally circular in cross-section or may have a generally rectangular or elliptical cross-section as shown in FIGS. 2 and 3. The installation 170 will be described in connection with a generally rectangular section secondary cable 128 such as the cable 50 shown in FIG. 2, although it is to be understood that this is not to be taken as limiting, and the cable could have any other cross-section.

Figure 6:
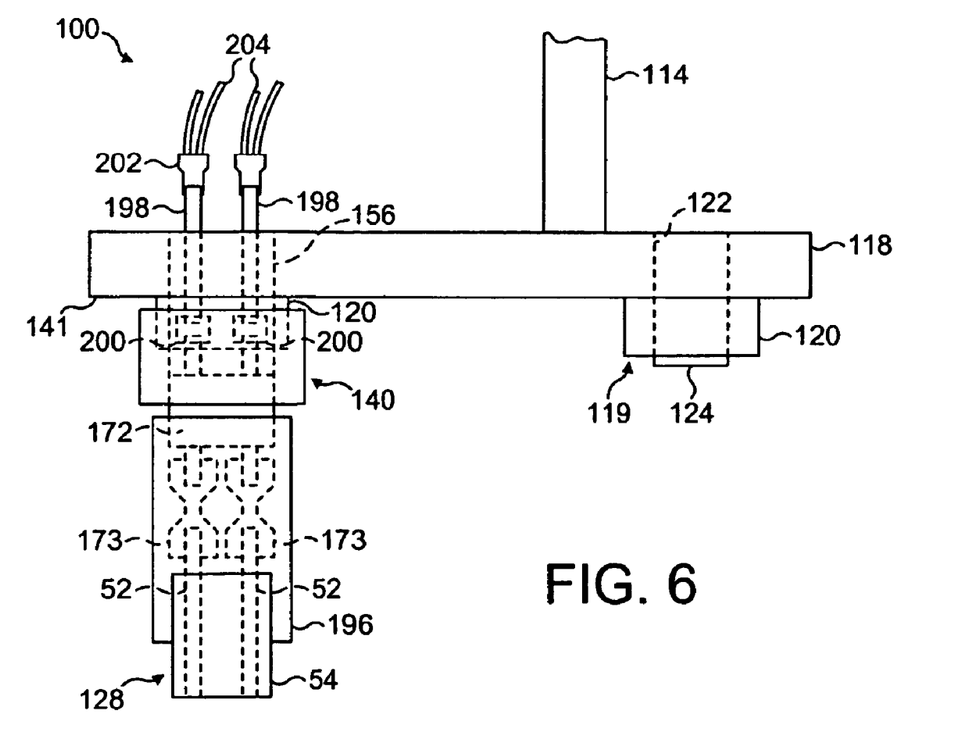
FIG. 6 is an enlargement of a portion of FIG. 4 showing a modification thereto.

In the installation 170, the secondary cable 128 is connected to an adapter 72 by means of two further push-fit connectors 173. The push-fit connector 140, and the further push-fit connectors 173 are of the same construction, it being understood that the difference between them is one of scale. The push-fit connectors 173 each have a first end 174, a second end 175 and a through-passage 176 extending between the first and second end. Each end 174, 175 houses one or more O-rings 177 and a collet-like gripping member 178.

Figure 7:
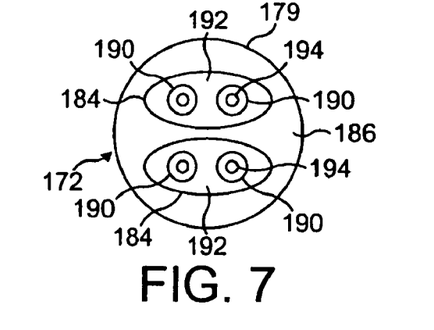
FIG. 7 is an end elevation of an adapter used in the installation shown in FIG. 6.
Figure 8:
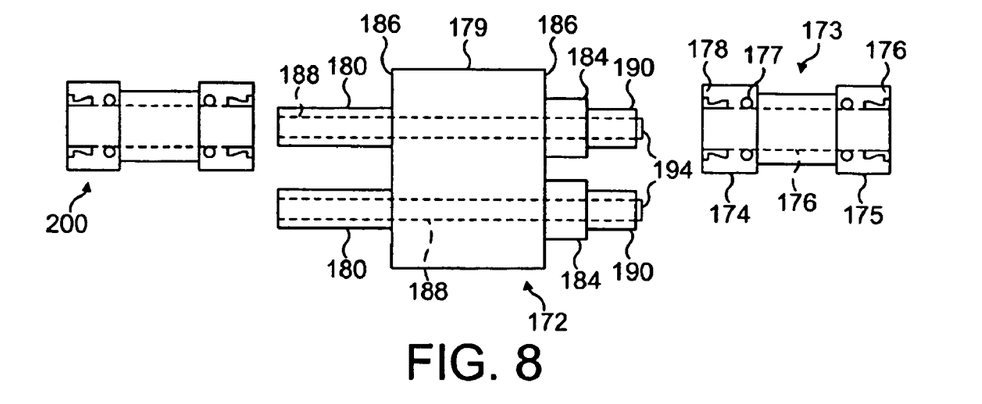
FIG. 8 is a side elevation of the adapter of FIG. 7 and push-fit connectors for use therewith.
Figure 9:
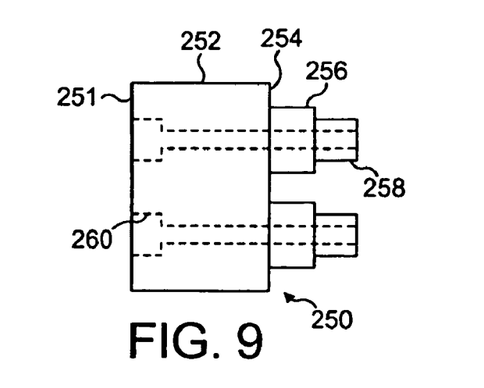
FIG. 9 is a side elevation of an alternative adapter.

As best seen in FIGS. 7 and 8, the cable adapter 172 comprises a circular section body 179. Four tubes 180 project from one end 182 of the body 179 and two elliptical spigots 184 project from the opposite end 186 of the body. Respective through-passages 188 defined in the tubes 180 pass axially through the body 179 and one of the elliptical spigots and end at the free end of a respective circular section projection 190 that projects from an end surface 192 of the respective elliptical spigot 184. The ends of the through-passages 188 located in the projection 190, are closed by respective knockouts 194. The cable adapter is preferably made from a plastics material, preferably a thermoplastic resin, for instance Acrilonitrile Butadiene Styrene (ABS). The adapter can be manufactured in any suitable manner as known in the art, such as by moulding, for instance, by injection moulding. It is anticipated that a cable adapter suitable for use with a cable having a nominal 16.0 mm diameter would have a body 178 with a length of 10.0 mm and tubes 180 and projections 190 of 5.0 mm diameter. The overall length of the adapter would be 25 mm and the push-fit connectors 173 would be selected to be push-fittable onto a 5 mm diameter tube.

In order to install the optical fibre cable 50, an inlet 119 is selected and the knockout 124 that closes the through-passage 122 of the inlet is removed. The sheathing 54 of the cable is stripped back a suitable distance to expose the four tubes 52. Push-fit connectors 173 are fitted to each of the tubes 52 by pushing the respective second ends 175 onto the exposed end of the tubes so that the tube end passes through the respective gripping member 178 and O-ring 177. The O-ring 177 sealingly engages the tube 52 and the gripping member 178, which is expanded by the tube, firmly grips the tube so that it resists withdrawal from the connector.

The knockouts 194 of the elliptical spigots 184 of the cable adapter 172 are removed and the first ends 174 of the respective push-fit connectors 173 are then pushed onto the circular projections 190, which define a mating region for the push-fit connectors. The O-rings 177 sealingly engage the respective projections 190 and the gripping members 178 firmly grip the projections so that the cable adapter 172 is firmly connected with the tubes 52 of the cable 128 by way of the four push-fit connectors 173.

A heat shrink sleeve 196, made of, for example cross-linked polythene with a hot melt adhesive, is slid over the cable adapter 172 and the adjacent end of the cable sheathing 54 and heat is applied to collapse the sleeve onto the adapter and sheathing. The primary function of the sleeve is to exclude dirt and moisture, although it may also assist in fixing the relative positions of the cable and adapter. It is, however, to be understood that the sleeve 196 is not essential as the push-fit connectors 173 provide a secured and sealed connection.

The push-fit connector 140 is push-fitted onto the free end of the cable adapter 172. The O-ring 156 of the connector 140 at the end fitted to the cable adapter 172 seals against the adapter body 179 and the collet 152 grips the adapter body so that there is a firm connection between the cable adapter, and therefore the cable 128, and the push-fit connector 140.

Respective guide tubes 198, preferably of the same diameter as the tubes 52 of the cable, are connected with the free ends of the tubes 180 of the cable adapter 172 by means of respective push-fit connectors 200. These push-fit connectors 200 are preferably of the same size and type as the push-fit connectors 173 and sealingly connect the guide tubes 198 and the adapter tubes 180 in the same way as the push-fit connectors 173 connect the cable tubes 52 and the circular projections 190. Finally, the end of the push-fit connector 140 remote from the cable adapter 172 is push-fitted onto the spigot 120 with the guide tubes 198 passing through the through-hole 122 and projecting from the base member 118 in the same general direction as the joint spine 114. In the same way as previously described, the push-fit connector 140 sealingly grips the spigot 120 and firmly connects the cable 128 with the base member 118 via the push-fit connectors 173 and the cable adapter 172.

In a preferred embodiment of the installation 170, the optical fibre cable 128 does not include any optical fibres. These fibres are to be installed later by known blown fibre techniques. For example, such fibres as are described in any one of EP-A-0345968, EP-A-0521710 or EP-A-0646818 may be introduced into the tubes by the blowing technique described in EP-A-0108590.

It will be appreciated that the push-fit connectors 173, 200, the cable adapter 172 and the guide tubes 198 combine to define four continuous passages extending from the cable 50 beyond the base member 152 through which optical fibres from the cable can be introduced into the region of the joint area defined by the splice trays. Preferably, manifolds 202 as described in the applicant's copending application EP01305228.7 are fitted to the ends of the guide tubes 198 opposite the ends engaged by the push-fit connectors 200 (that is those ends that relatively speaking are disposed adjacent the joint area defined by the splice trays) and the optical fibres are routed to the splice trays by means of polyethylene transport tubes 204 that lead from the manifolds to individual splice trays. It will be appreciated that other methods of distributing the optical fibres from the guide tubes 198 to the joint area may be adopted as is convenient.

It will be appreciated that as with the installation 100, the spigots 120 of the installation 170 may be more closely packed than in a conventional installation, because any heat that has to be applied to shrink the sleeving onto the optical fibre cable can be applied with the cable 128 and cable adapter 172 removed from the vicinity of the base member 118 to a position at which the heat will not affect other cables passing through the base member.

It will be understood that although the mating regions of the inlets 119 are in the form of spigots, any mating region could take the form of a depression engageable by a push-fit connector, or a spigot surrounded by a depression.

The cable adapter 172 has been described in the context of installing an optical fibre cable 128 having four tubes 52 for optical fibres. The cable adapter could equally be used in conjunction with a pair of two-tube optical fibre cables such as the cable 60 shown in FIG. 3. One advantage of using two-tube cables would be that if at the time of the initial installation there was insufficient demand to require a four-tube cable, one two-tube cable could be installed, and a second installed at a later date if required. In this case, if heat shrink sleeving were required between the cable and the adapter, it would be applied around the sheathing 64 of the cable 60 and the elliptical spigot 90 to which the cable was connected.

The cable adapter 172 has been shown provided with knockouts provided on the projections 190 as a means of blocking the passages 188. Of course, the passages could be blocked by providing knockouts at the free ends of the tubes 180, as well as, or instead of the knockouts 194. Alternatively, the passages 188 could be blocked by other means such as plugs.

The cable adapter 172 is shown in a configuration suitable for use in installations comprising one four-tube optical fibre cable or a pair of two-tube cables. To this end, the spigots are shown as being elliptical. If the cable adapter were intended for connection with four-tube cables only, the elliptical spigots could be omitted and four tubes provided on each side of the adapter body. Alternatively, the four projections 190 could project from a single circular section spigot.

A modified cable adapter 250 is shown in FIG. 8. This differs from the cable adapter 172 only in that there are no tubes 180 and instead, the end 251 of the cable adapter body 252 opposite the end 254 provided with the elliptical spigots 256 and circular projections 258, is provided with counterbores 260 into which the guide tubes 198 would be push-fitted. The counterbores and guide tubes are designed to provide some interference therebetween so as to maintain the tube in engagement with the counterbore once push-fitted therein.

A further modification of the cable adapter 172, not illustrated, comprises lengthening the tubes 180 shown in FIG. 7 so that these pass through the through-hole 122 in the base member 118 such that, for example, the manifolds 202 are directly connected to these lengthened tubes, thus avoiding the use of the push-fit connectors 200 and tubes 198.

In a further modification of the cable adapters 172, 250 (not shown) the spigots 184, 256 and projections 190, 258 are replaced by counterbores similar to the counterbores 260. Such counterbores are push-fitted onto and directly engage the tubes of the optical fibre cable. In an alternative arrangement, the counterbores are arranged to engage a push-fit connector fitted to an end of the tube.

It will be understood that as an alternative to using blown fibre techniques, the optical fibre cables used in the installations may have pre-installed optical fibres, in which case in preparing the optical fibre cable to make a connection with the base member, it would be necessary to suitably strip both the sheathing and tubes of the cable.

It will be understood that by using a cable adapter such as the cable adapters 148, 172, it is possible to simply and reliably connect the secondary optical fibre cable 128 to the base member 118 using standard push-fit connectors, such as those made by John Guest Connectors Ltd, so that it is no longer necessary to use heat shrink sleeving such as that shown in FIG. 1. It will also be appreciated that the invention is not limited to application to new installations and that optical fibre cables could similarly be connected to existing installations in the same way.

What is claimed is:

1. An optical fiber assembly, comprising:
   a component defining at least one inlet for optical fibers;
   an adapter;
   an optical fiber cable connected to the adapter; and
   a push-fit connector;
   wherein the component comprises:
      a through-hole for passage of the optical fibers; and
      an associated mating region to engage the push-fit connector;
   wherein the optical fiber cable connected to the adapter defines a connection region with a predetermined cross-sectional shape for mating with the push-fit connector,
   wherein the push-fit connector comprises:
      a first end;
      a second end; and
      a through-passage extending between the first and second ends;
   wherein the first end is push-fit connected with the mating region,
   wherein the second end is push-fit connected to the connection region, and
   wherein optical fibers from the optical fiber cable can be directed through:
      the push-fit connector; and
      the through-hole.

2. The assembly of claim 1, wherein the optical fiber cable comprises:
   at least one tube for receiving optical fibers;
   wherein the optical fibers are installed by blowing the optical fibers along the at least one tube.

3. The assembly of claim 2, wherein the at least one tube comprises at least one optical fiber installed in the at least one tube.

4. The assembly of claim 1, wherein the mating region comprises:
   a projection on the component.

5. The assembly of claim 1, wherein a second portion of the adapter is connected to an end of the optical fiber cable by at least one additional push-fit connector.

6. An optical fiber assembly, comprising:
   a component to which an optical fiber cable is to be connected;
   a push-fit connector; and
   an adapter for the push-fit connector;
   wherein the component defines at least one optical fiber inlet,
   wherein the component comprises:
      a through-passage; and
      an associated mating region to engage the push-fit connector;
   wherein the push-fit connector comprises:
      a first end; and
      a second end;
   wherein the first end is push-fit connected to the mating region,
   wherein the adapter comprises:
      a first portion; and
      a second portion;

wherein the first portion is push-fit connected to the second end, and wherein the second portion is push-fit connected to an end of the optical fiber cable.

7. The assembly of claim 6, wherein the optical fiber cable comprises:
   at least one tube for optical fibers;
   wherein the at least one tube is connected to the adapter by push-fitting.

8. The assembly of claim 6, wherein the adapter defines a plurality of through-passages for optical fibers,
   wherein each through-passage has an associated mating region to engage a push-fit connector, and
   wherein an end of the optical fiber cable is connected to the adapter by at least one additional push-fit connector disposed to engage the mating region.

9. The assembly of claim 6, wherein the adapter defines a plurality of spigots, and
   wherein each spigot comprises at least one mating region.

10. The assembly of claim 9, wherein each spigot has a generally elliptical cross-sectional shape,
    wherein each spigot comprises two mating regions, and
    wherein an end of the optical fiber cable is connected to the adapter by respective additional push-fit connectors disposed to engage the mating region of one of the spigots.

11. The assembly of claim 10, further comprising:
    a second optical fiber cable;
    wherein the second optical fiber cable comprises:
    an end connected with the adapter by other additional push-fit connectors disposed to engage the mating region of another of the spigots.

12. The assembly of claim 1, further comprising:
    at least two optical fiber cables;
    wherein the component defines a plurality of the inlets,
    wherein optical fibers of the at least two optical fiber cables are connected to respective inlets by respective push-fit connectors, and
    wherein the push-fit connectors are disposed to engage:
    respective mating regions, and
    respective adapters.

13. The assembly of claim 1, wherein the optical fiber cable has a generally rectangular cross-sectional shape.

14. The assembly of claim 1, wherein the optical fiber cable has a generally elliptical cross-sectional shape.

15. A method of installing optical fibers in a joint housing, the method comprising:
    connecting an optical fiber cable to an adapter;
    push-fit connecting the adapter to a push-fit connector; and
    push-fit connecting the push-fit connector with a mating region associated with an optical fiber inlet of a joint housing;

wherein the adapter comprises a connection region with a predetermined cross-sectional shape for mating with the push-fit connector,
    wherein the push-fit connector defines a through-passage, and
    wherein push-fit connecting the push-fit connector with the mating region allows optical fibers of the optical fiber cable to pass into the optical fiber inlet via the through-passage.

16. The method of claim 15, further comprising:
    installing at least one optical fiber in at least one tube for housing optical fibers by blowing the at least one optical fiber along the at least one tube;
    wherein the optical fiber cable comprises the at least one tube.

17. The method of claim 16, further comprising:
    connecting an end of the optical fiber cable to the adapter using at least one additional push-fit connector.

18. The method of claim 15, wherein the adapter defines a plurality of connecting points for optical fiber cables, and
    wherein the optical fiber cable is connected to one of the connecting points.

19. The method of claim 18, further comprising:
    connecting an end of a second optical fiber cable to another of the connecting points.

20. The method of claim 18, further comprising:
    collapsing a heat shrink sleeve onto:
    an end of the optical fiber cable; and
    a surface of the connecting point to which the optical fiber cable is connected;
    wherein the connecting point defines a surface for engaging the heat shrink sleeve.

21. The method of claim 15, wherein the adapter defines a plurality of connecting points for optical fiber cables, and
    wherein an end of the optical fiber cable is connected to one of the connecting points.

22. The assembly of claim 6, further comprising:
    at least two optical fiber cables;
    wherein the component defines a plurality of the inlets,
    wherein optical fibers of the at least two optical fiber cables are connected to respective inlets by respective push-fit connectors, and
    wherein the push-fit connectors are disposed to engage:
    respective mating regions, and
    respective adapters.

23. The assembly of claim 6, wherein the optical fiber cable has a generally rectangular cross-sectional shape.

24. The assembly of claim 6, wherein the optical fiber cable has a generally elliptical cross-sectional shape.

* * * * *